(12) United States Patent
Fujimoto et al.

(10) Patent No.: US 6,648,020 B2
(45) Date of Patent: Nov. 18, 2003

(54) FLUID CONTROL APPARATUS AND GAS TREATMENT SYSTEM COMPRISING SAME

(75) Inventors: Hideki Fujimoto, Chigasaki (JP); Noboru Uzawa, Chigasaki (JP); Naoyuki Sato, Chigasaki (JP); Michio Yamaji, Osaka (JP); Shigeaki Tanaka, Osaka (JP); Yuji Kawano, Osaka (JP); Yasuyuki Omata, Osaka (JP); Masakazu Fukui, Osaka (JP)

(73) Assignee: Fujikin Incorporated, Osaka (JP)

( * ) Notice: Subject to any disclaimer, the term of this patent is extended or adjusted under 35 U.S.C. 154(b) by 0 days.

(21) Appl. No.: 09/948,125

(22) Filed: Sep. 7, 2001

(65) Prior Publication Data

US 2002/0033195 A1 Mar. 21, 2002

(30) Foreign Application Priority Data

Sep. 11, 2000 (JP) ........................................ 2000-274546

(51) Int. Cl.[7] .............................................. F16K 11/20
(52) U.S. Cl. ...................................... 137/884; 137/343
(58) Field of Search ................................ 137/269, 270, 137/271, 597, 884, 343

(56) References Cited

U.S. PATENT DOCUMENTS

| 5,819,782 A | | 10/1998 | Itafuji | |
|---|---|---|---|---|
| 5,992,463 A | * | 11/1999 | Redemann et al. | 137/884 |
| 6,068,016 A | * | 5/2000 | Manofsky, Jr. et al. | 137/269 |
| 6,231,260 B1 | * | 5/2001 | Markulec et al. | 403/24 |
| 6,273,139 B1 | * | 8/2001 | Ohmi et al. | 137/884 |

FOREIGN PATENT DOCUMENTS

FR           2 570 493           3/1986

* cited by examiner

Primary Examiner—John Fox
(74) Attorney, Agent, or Firm—Armstrong, Westerman, & Hattori, LLP

(57) ABSTRACT

A fluid control apparatus comprises lines A1, A2, A3, A4, A5, B1, B2, B3 each removably attached to a substrate 1 by a plurality of brackets 8, 9, 18, 19, 20, and channel communication means 47, 48 which are removable upward.

5 Claims, 17 Drawing Sheets

Fig. 2
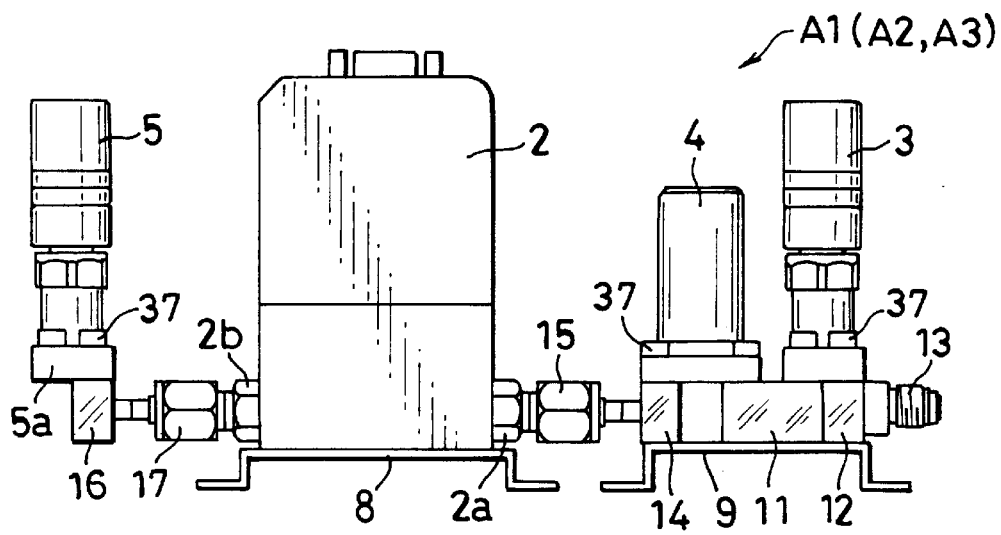
(a)
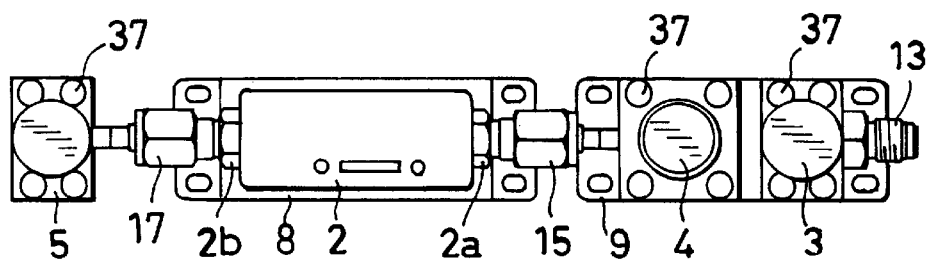
(b)
Fig. 4
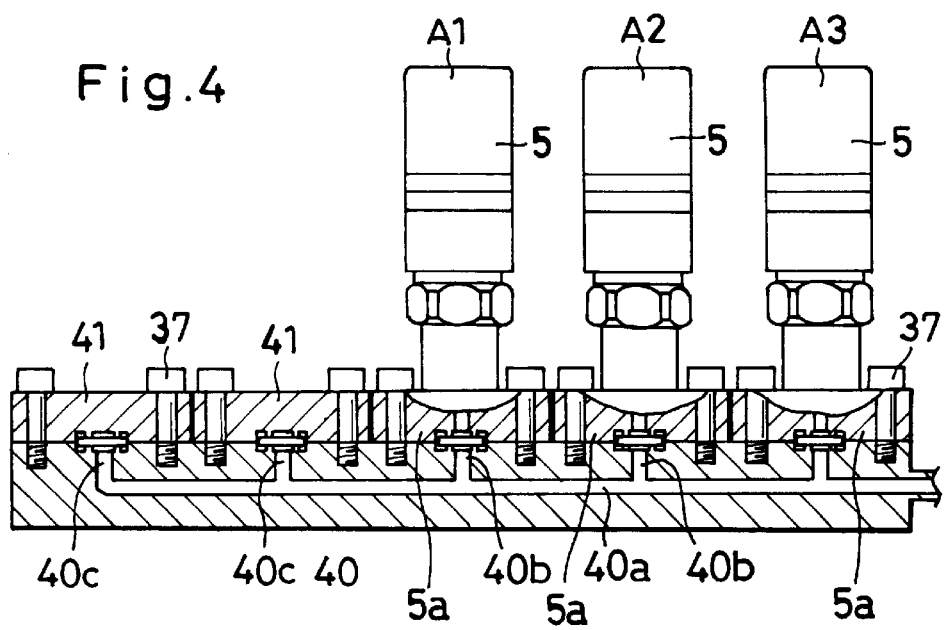

FLUID CONTROL APPARATUS AND GAS TREATMENT SYSTEM COMPRISING SAME

BACKGROUND OF THE INVENTION

The present invention relates to apparatus and systems for use in semiconductor manufacturing equipment, i.e., fluid control apparatus and gas treatment systems comprising the apparatus, and more particularly to integrated fluid control apparatus which are so assembled that the fluid control components thereof can be individually removed upward for maintenance or inspection, and also to gas treatment systems having the apparatus incorporated therein.

The terms "front," "rear," "upper" and "lower" as used herein have the following meanings. The term "front" refers to the right-hand side of FIG. 2, and the term "rear" to the left-hand side of the same. The terms "upper" and "lower" refer respectively to the upper and lower sides of FIG. 2(a), and the terms "left" and "right" are used for the apparatus as it is seen from the front rearward. These terms are used for convenience sake; the apparatus may be used as reversed with respect to the longitudinal direction, or as laid on its side.

Fluid control apparatus for use in semiconductor manufacturing equipment comprise a plurality of rows of various fluid control devices, and the fluid control devices of adjacent rows have their fluid channels interconnected by connecting means at specified locations. With such fluid control apparatus, massflow controllers, on-off valves and other components are connected together for integration without using tubes in recent years (see, for example, JP-A No. 9-29996 (1997). FIG. 18 is a plan view showing such an example of apparatus. The illustrated fluid control apparatus has five lines P1, P2, P3, P4, P5 having no bypass channel, and three lines Q1, Q2, Q3 each having a bypass channel, i.e., eight lines in total. The lines P1, P2, P3, P4, P5 having no bypass line each comprise a massflow controller 91, on-off valve 92 disposed at the inlet side thereof with a filter 93 interposed therebetween, and on-off valve 94 disposed at the oulet side of the contoller. The bypass-equipped lines Q1, Q2, Q3 each comprise a massflow controller 91, two on-off valves 95, 96 provided at the inlet side thereof with a filter 93 interposed between the controller and the valve 95, two on-off valves 97, 98 provided at the outlet side of the controller, and a bypass pipe 99 having an on-off valve 99a and interconnecting a connector at the inlet side of the controller 91 and a connector at the outlet side thereof. The fluid control apparatus is assembled by fastening coupling members (not shown) such as block couplings to a substrate 100 with screws first, and subsequently mounting each of fluid control devices 91, 92, 93, 94, 95, 96, 97, 98, such as massflow controller, filter and on-off valves, generally on two of these coupling members. Since the bypass pipes 99 are provided in parallel to the main portions of the bypass-equipped lines Q1, Q2, Q3, the provision of the bypass pipes 99 for the three lines Q1 to Q3 requires a space for the three lines.

Fluid control apparatus of the type mentioned are used for gas treatment systems, for example, for conducting treatment with plasma, etching or forming films by CVD.

In the case of the conventional fluid control apparatus described, the individual fluid control devices can be removed upward for inspection, repair or replacement, whereas full consideration has not been given to installation of additional lines and modifications of lines. Accordingly, when there arises a need to modify the system, the components required anew are mounted on a panel for the substitution of the panel assembly, but this gives rise to the problem of entailing the shutdown of the system for a long period of time or an increase in the number of work steps at the site of installation. The conventional fluid control apparatus further has the problem of necessitating an increased overall space for installation since the space for the installation of the bypass-equipped lines is greater than that for the line having no bypass channels, and the problem that the size of the substrate needs to be altered depending on the number of bypass-equipped lines.

In view of the situation, it has become important that fluid control apparatus of the type described be adapted to readily fulfill the need to install additional lines or modify the existing lines.

Further when the gas treatment system comprising the conventional fluid control apparatus and as adapted, for example, for etching a silicon dioxide film is to be used for a different substance, e.g., for etching polysilicon, there is a need to additionally use a gas of the chlorine type. In this case, it is necessary to completely disassemble the fluid control apparatus and to fabricate an apparatus anew. If it is attempted to modify the fluid control apparatus or to add components thereto in the existing gas treatment system, it is not easy to remove, disassemble or modify the fluid control apparatus or add components thereto at the limited site of use as in a clean room, consequently seriously shortening the operation hours.

SUMMARY OF THE INVENTION

An object of the present invention is to provide an integrated fluid control apparatus which is readily adapted for additional provision of lines or modification of existing lines, and a gas treatment system having such a fluid control apparatus incorporated therein.

The present invention provides a fluid control apparatus comprising a plurality of lines arranged in parallel on a substrate and having outlets oriented in the same direction, each of the lines comprising a plurality of fluid control devices arranged at an upper level and a plurality of coupling members arranged at a lower level, said lines including specified lines connected to one another by channel communication means, the fluid control apparatus being characterized in that each of the lines is removably attached to the substrate by a plurality of brackets, the channel communication means being removable upward.

With the fluid control apparatus of the present invention, each of the lines is removably attached to the substrate by a plurality of brackets, with the channel communication means made removable upward, so that lines can be additionally installed merely by upwardly removing the channel communication means when so required, thereafter attaching the lines to be added to the substrate, and finally installing in place the channel communication means required for the addition. Further lines can be changed merely by upwardly removing the channel communication means as required, thereafter removing the old lines to be changed, attaching the lines to be substituted to the substrate, and finally installing in place the channel communication means required for the change. Thus, lines can be added or changed with ease.

Preferably, a manifold block coupling disposed at the lower level for connecting at least three of the lines is provided on at least one of inlet side and outlet side and attached to the substrate by a bracket. The plurality of lines can then be connected by a simplified arrangement to render the fluid control apparatus easy to assemble or modify.

Preferably, the manifold block coupling is provided with at least one line adding branch channel having an opening closed with a closing member. An additional line can then be provided merely by removing the closing member and connecting a corresponding member of the new line to the branch channel of the manifold block coupling. This facilitates addition of line or lines or modification of the fluid control apparatus.

Preferably, the lines are lines having no bypass channel and lines each having a bypass channel, and the bypass-equipped lines each have a bypass pipe for connecting an inlet side of a specified fluid control device to an outlet side thereof above the fluid control device. The lines having no bypass channel and the bypass-equipped lines can then be given the same width. This assures facilitated modification, further serving to diminish the space to be occupied by the fluid control apparatus.

It is desired that the fluid control apparatus be used in gas treatment systems such as plasma treatment systems. The gas treatment system can then be modified easily in accordance with alterations in the specifications to suppress the factors that would shorten the operation hours of the system.

BRIEF DESCRIPTION OF THE DRAWINGS

FIGS. 2(a) and (b) are a side elevation and a plan view, respectively, which show the construction of a line having no bypass channel;

FIG. 4 is a view in section showing a manifold block coupling for interconnecting lines having no bypass channel;

DESCRIPTION OF THE PREFERRED EMBODIMENTS

Embodiments of the present invention will be described below with reference to the drawings.

Figure 1:
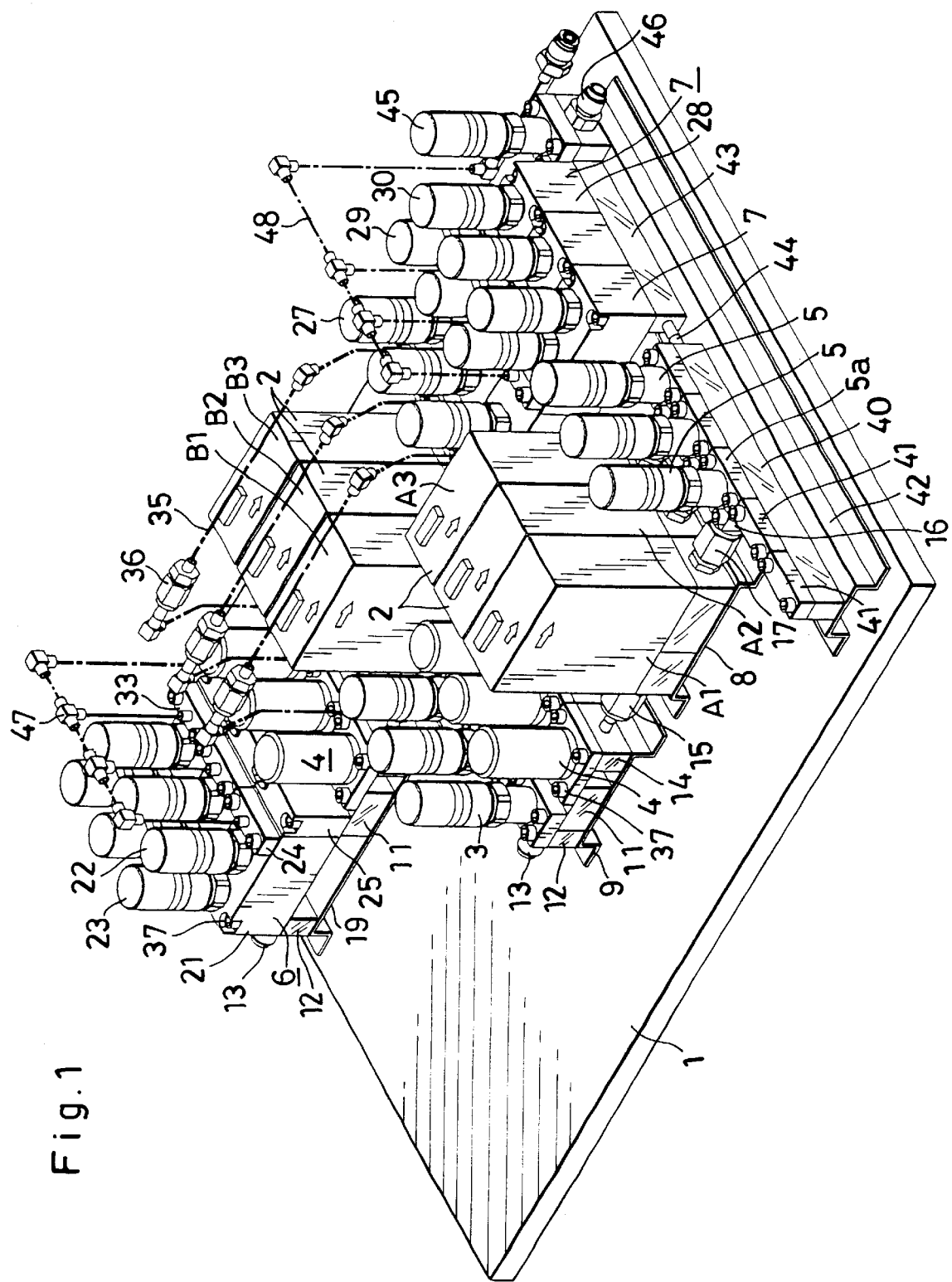
FIG. 1 is a perspective view showing a first embodiment of fluid control apparatus according to the invention.

With reference to FIG. 1, a first embodiment of fluid control apparatus of the present invention is fabricated by arranging in parallel on a substrate 1 three lines A1, A2, A3 having no bypass channel, and three lines B1, B2, B3 each having a bypass channel.

The lines A1, A2, A3 having no bypass channel and the bypass-equipped lines B1, B2, B3 each comprise a plurality of fluid control devices 2, 3, 4, 5, 6, 7, such as a massflow controller, on-off valve and shutoff-opening device, which are arranged at a higher level, and a plurality of coupling members 11, 12, 13, 14, 15, 16, 17 arranged at a lower level for holding the fluid control devices 2, 3, 4, 5, 6, 7 in communication with one another.

The fluid control devices of each of the lines A1, A2, A3 having no bypass channel are the massflow controller 2, inlet-side on-off valve 3 connected to the inlet side of the massflow controller 2 by way of a filter 4, and the outlet-side on-off valve 5 provided at the outlet side of the massflow controller 2. The fluid control devices of each of the bypass-equipped lines B1, B2, B3 are the massflow controller 2, inlet-side shutoff-opening device 6 connected to the inlet side of the massflow controller 2 by way of a filter 4, and the outlet-side shutoff-opening device 7 provided at the outlet side of the massflow controller 2.

With reference to FIG. 2, the massflow controller 2 of each of the lines A1, A2, A3 having no bypass channel has an inlet-side connector 2a and an outlet-side connector 2b on the front and rear walls of its lower end and is attached to the substrate 1 by an inverted U-shaped bracket 8 having outward projecting edges. The filter 4 is held in communication with the inlet-side on-off valve 3 by a block coupling 11 disposed below these components. Disposed below the front half of the inlet-side on-off valve 3 is another block coupling 12, which is provided with an inlet-side tubular coupling 13. A block coupling 14 is also disposed below the rear half of the filter 4. Attached to this coupling 14 is a tubular coupling 15 joined to the inlet-side connector 2a of the massflow controller 2. Provided below the front half of the outlet-side on-off valve 5 is a block coupling 16 similar to the coupling 14 disposed below the filter 4. Attached to this coupling 16 is a tubular coupling-17 joined to the outlet-side connector 2b of the massflow controller 2. With screws 37, the three block couplings 11, 12, 14 arranged on the inlet side at the lower level are fastened to the filter 4 or inlet-side on-off valve from above and are further attached to an inverted U-shaped bracket 9 having outward edges. The bracket 9 is attached to the substrate 1. The lines A1, A2, A3 having no bypass channel are removably mounted on the substrate 1 in the state shown in FIG. 2. The massflow controller 2 is singly removable upward by removing the couplings 15, 17 from its opposite sides, and the filter 4 and the on-off valves 3, 5 are individually removable upward by removing the screws 37.

The block coupling 12 having the inlet-side tubular coupling 13 is disposed below the inlet-side on-off valve 3 at a location away from the massflow controller 2, whereas like coupling is not provided below the outlet-side on-off valve 5 at a position away from the massflow controller 2. Disposed instead is a manifold block coupling 40 which singly connects the three lines A1, A2, A3, to one another as seen in FIG. 1.

As shown in FIG. 4, the manifold block coupling 40 has a channel extending laterally, i.e., a main channel 40a orthogonal to the lines A1, A2, A3 having no bypass channel, and five branch channels 40b, 40c branching off from the main channel 40a and extending upward. The main channel 40a has one end opened leftward and is closed at the other end. The rear halves of bodies 5a of the outlet-side on-off valves 5 of the lines A1, A2, A3 are attached to the manifold block coupling 40 respectively in communication with the three 40b of the branch channels 40b, 40c. Channel closing blocks (closing members) 41 are fastened to the manifold block coupling 40 to close the remaining two channels 40c. Accordingly, the fluid passing through the massflow controller 2 of each of the lines A1, A2, A3 flows into the outlet-side on-off valve 5 via the block coupling 16 below the valve 5. The manifold block coupling 40 is fixed to the substrate 1 by an inverted U-shaped bracket 42.

Figure 3:
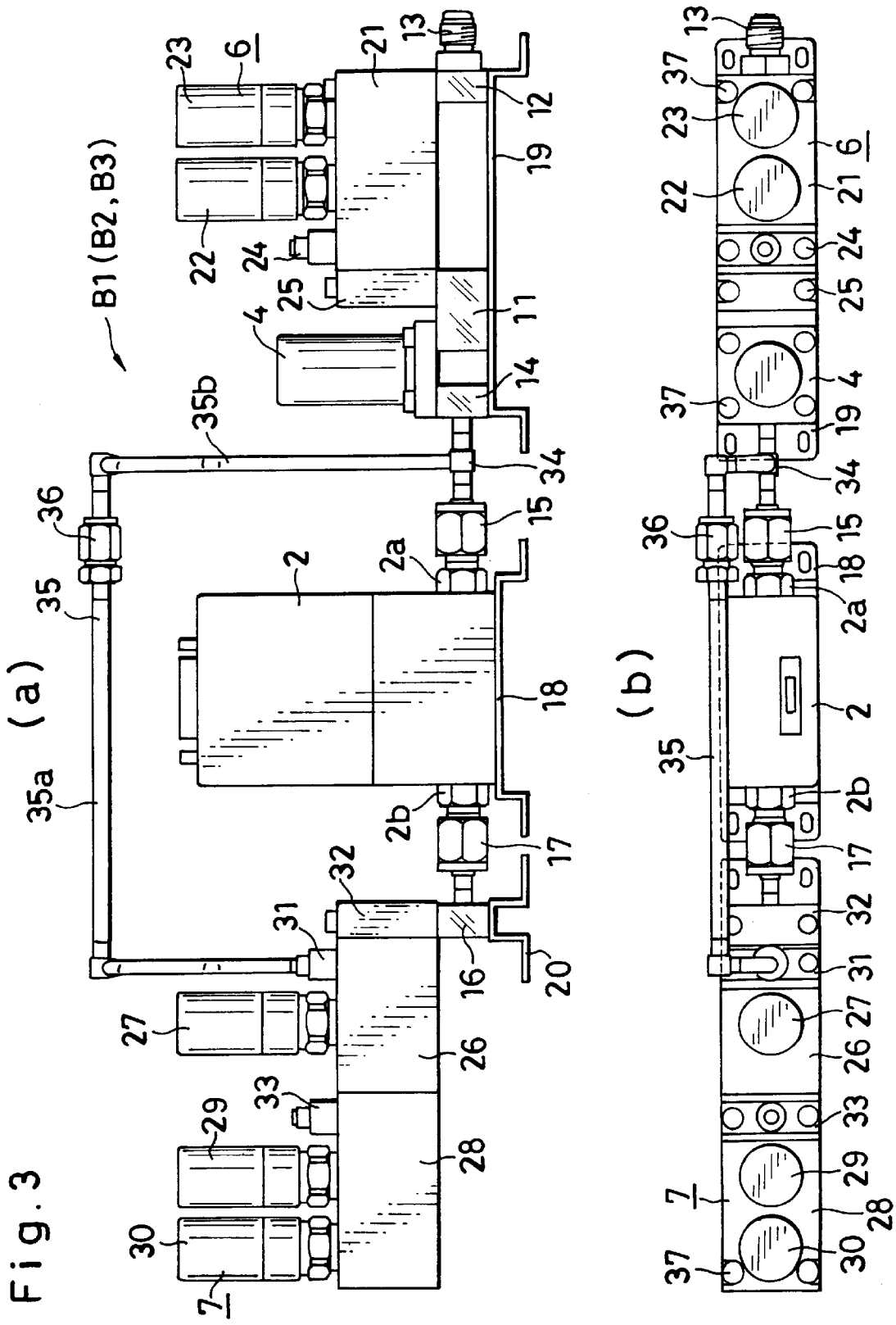
FIGS. 3(a) and (b) are a side elevation and a plan view, respectively, which show the construction of a line having a bypass channel.

With reference to FIG. 3, the massflow controller 2 of each of the bypass-equipped lines B1, B2, B3 has an inlet side connector 2a and an outlet-side connector 2b respectively on the front and rear walls of its lower end and is mounted on the substrate 1 by an inverted U-shaped bracket 18 having outward projecting edges. The inlet-side shutoff-opening device 6 comprises a block body 21, two on-off valve actuators 22, 23 mounted thereon, a block coupling 24 having a tubular connector and mounted on the top wall of the body 21, and a channel block 25 attached to a side wall of the body.

The filter 4 is held in communication with the channel block 25 of the inlet-side shutoff-opening device 6 by a block coupling 11 disposed below these components. A block coupling 12 is disposed below the front end of body 21 of the device 6 and provided with an inlet-side tubular coupling 13. A block coupling 14 is disposed also below the rear half of the filter 4 and has attached thereto a coupling 15 joined to the inlet-side connector 2a of the massflow controller 2. By screws 37, the three lock couplings 11, 12, 14 at the lower level are fastened from above to the filter 4 and the body 21 of the shutoff-opening device 6 and further to an inverted U-shaped bracket 19 having outward projecting edges. The bracket 19 is fixed to the substrate 1.

The outlet-side shutoff-opening device 7 comprises a first block body 26 disposed close to the massflow controller 2, a first on-off valve actuator 27 mounted on the body 26, a second block body 28 disposed in the rear of and adjacent to the first block body 26, two on-off valve actuators 29, 30 mounted on the body 28, a block coupling 31 having a tubular connector and mounted on the top wall of the first body 26, a channel block 32 attached to a side wall of the body 26 and a block coupling 33 having a tubular connector and mounted on the top wall of the second body 28.

Disposed under the channel block 32 of the outlet-side shutoff-opening device 7 is a block coupling 16 having attached thereto a tubular coupling 17 joined to the outlet-side connector 2b of the massflow controller 2. The block coupling 16 under the channel block 32 is singly attached to the substrate 1 by an inverted U-shaped bracket 20 having outward projecting edges.

A T-shaped tubular coupling 34 for branching off a bypass channel is disposed between the block coupling 14 under the filter 4 and the tubular coupling 15 for connection to the massflow controller 2. An inverted U-shaped bypass pipe 35 extending above the massflow controller 2 has one end joined to the T-shaped coupling 34 and the other end joined to the connector-equipped block coupling 31 of the outlet-side shutoff-opening device 7. Provided at an intermediate portion of the bypass pipe 35 is a tubular coupling 36 which makes the pipe 35 dividable into an inverted L-shaped portion 35a and an I-shaped portion 35b.

The bypass-equipped lines B1, B2, B3 are removably mounted on the substrate 1 in the state shown in FIG. 3. The massflow controller 2 is singly removable upward by removing the couplings 15, 17 from opposite sides thereof. Further the filter 4 and the bodies 21, 26, 28 of the shutoff-opening devices 6, 7 and the channel blocks 25, 32 thereof are similarly removable individually by removing screws 37.

Like the outlet side of the lines A1, A2, A3 having no bypass channel, the rear end portions of the outlet-side shutoff-opening devices 7 are provided with a manifold block coupling 43 thereunder. Although not shown in detail, the manifold block coupling 43 has three branch channels which correspond to the branch channels 40b, 40c of the manifold block coupling 40 shown in FIG. 4. Channels in the rear end portions of second block bodies 28 of outlet-side shutoff-opening devices 7 of the bypass-equipped lines B1, B2, B3 are held in communication with one another by the manifold block coupling 43. The bracket 42 supporting thereon the manifold block coupling 40 for the lines having no bypass channel extends from one end of the substrate 1 to the other end thereof, and the manifold block coupling 43 for the bypass-equipped lines is fastened also to this bracket 42. The manifold block coupling 40 is connected to the manifold block coupling 43 by a communication pipe 44, and the terminating end of the manifold block coupling 43 serves as an outlet common to the two couplings 40, 43 and is provided with an on-off valve 45 having a tubular coupling 46.

The bypass-equipped lines B1, B2, B3 are connected to one another by interconnecting the tubular connector-equipped block couplings 24 of the inlet-side shutoff-opening devices 6 thereof and interconnecting the second tubular connector-equipped block couplings 33 of the outlet-side shutoff-opening devices 7 thereof respectively by inverted U-shaped communication pipes 47, 48 serving as channel communication means.

For example, two lines having no bypass channel are added to the fluid control apparatus thus constructed in the following manner.

Figure 5:
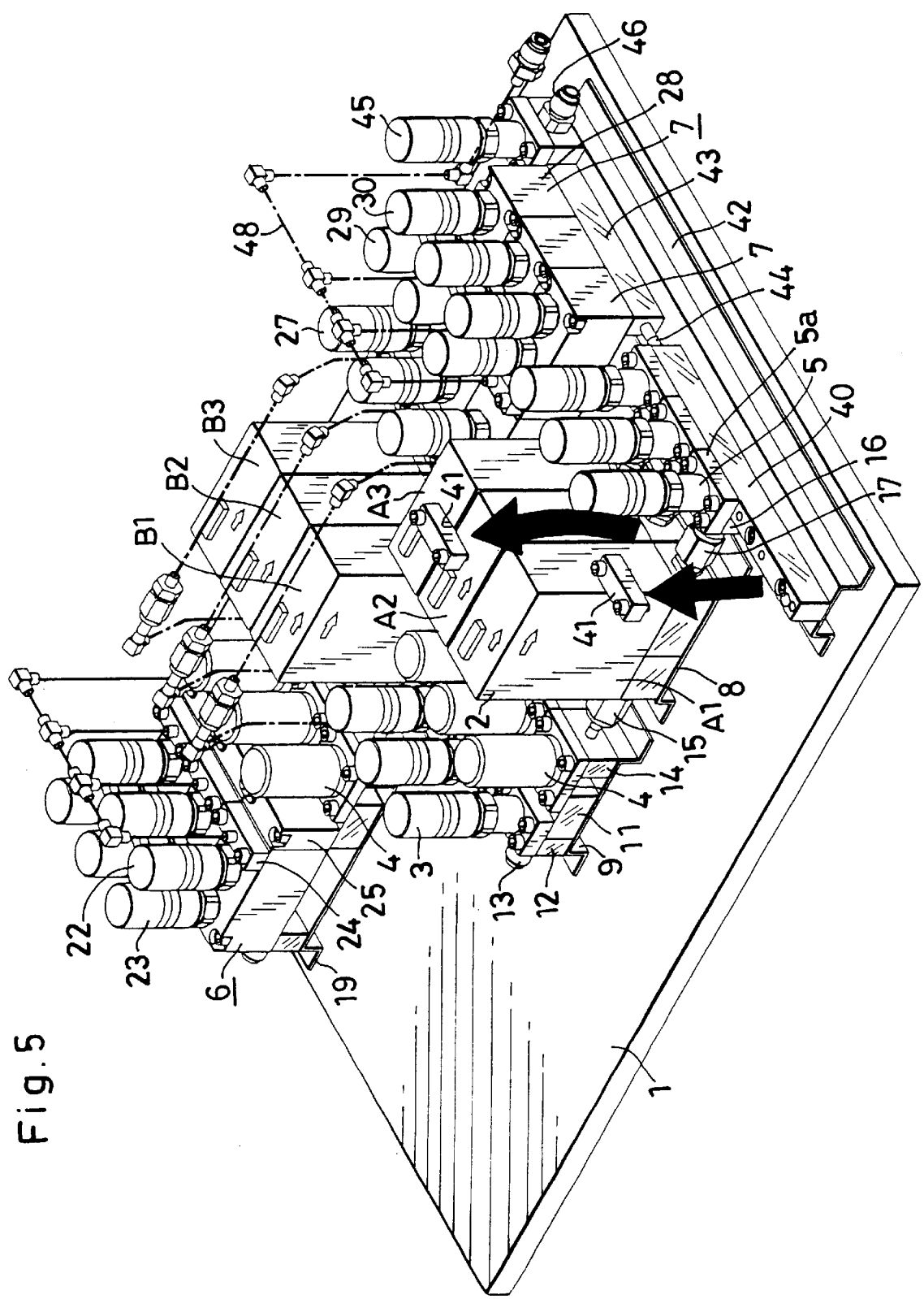
FIG. 5 is a perspective view showing a second embodiment of fluid control apparatus according to the invention.
Figure 6:
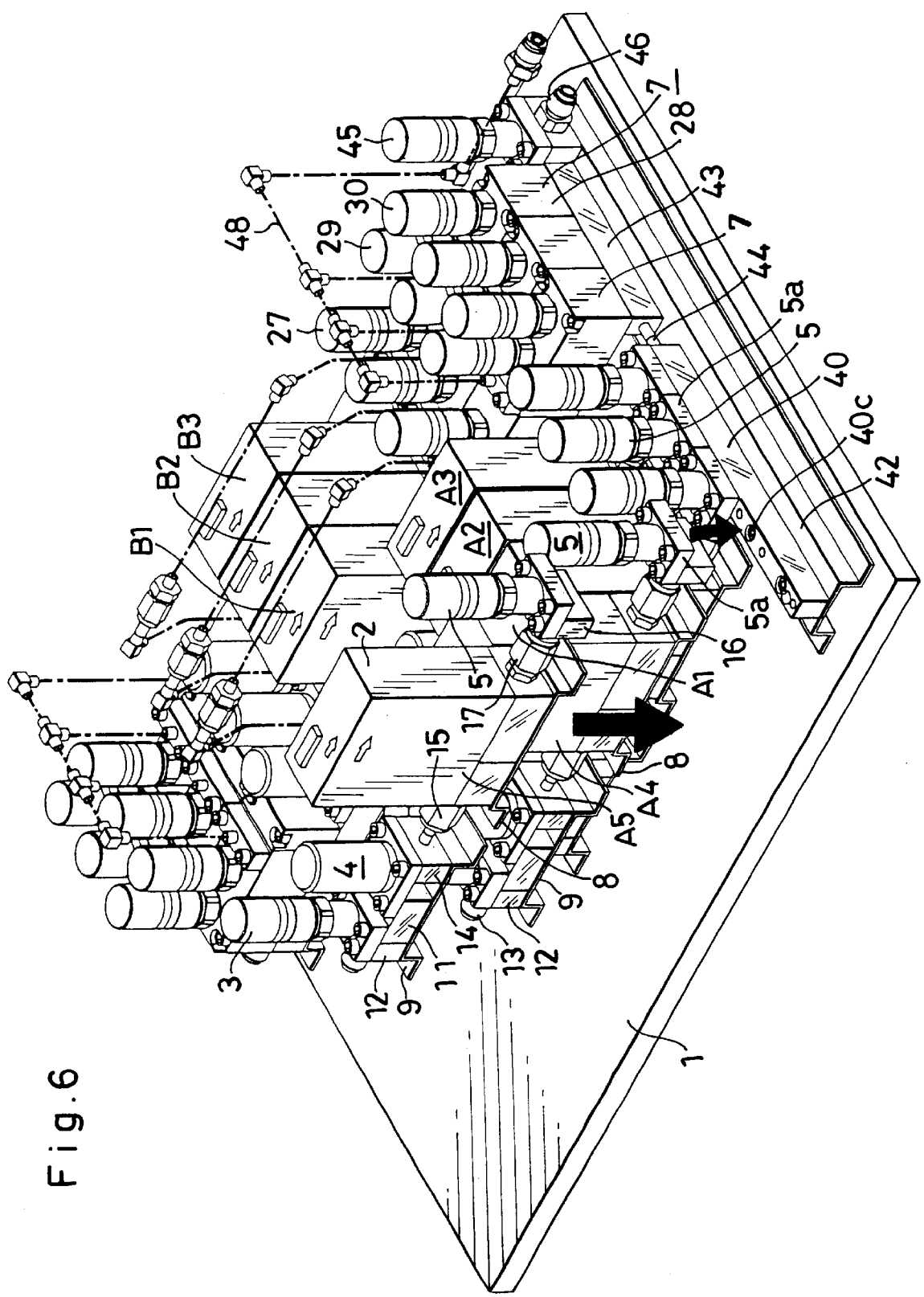
FIG. 6 is a perspective view for showing a procedure for adding anew lines having no bypass channel to the fluid control apparatus of FIG. 5.
Figure 7:
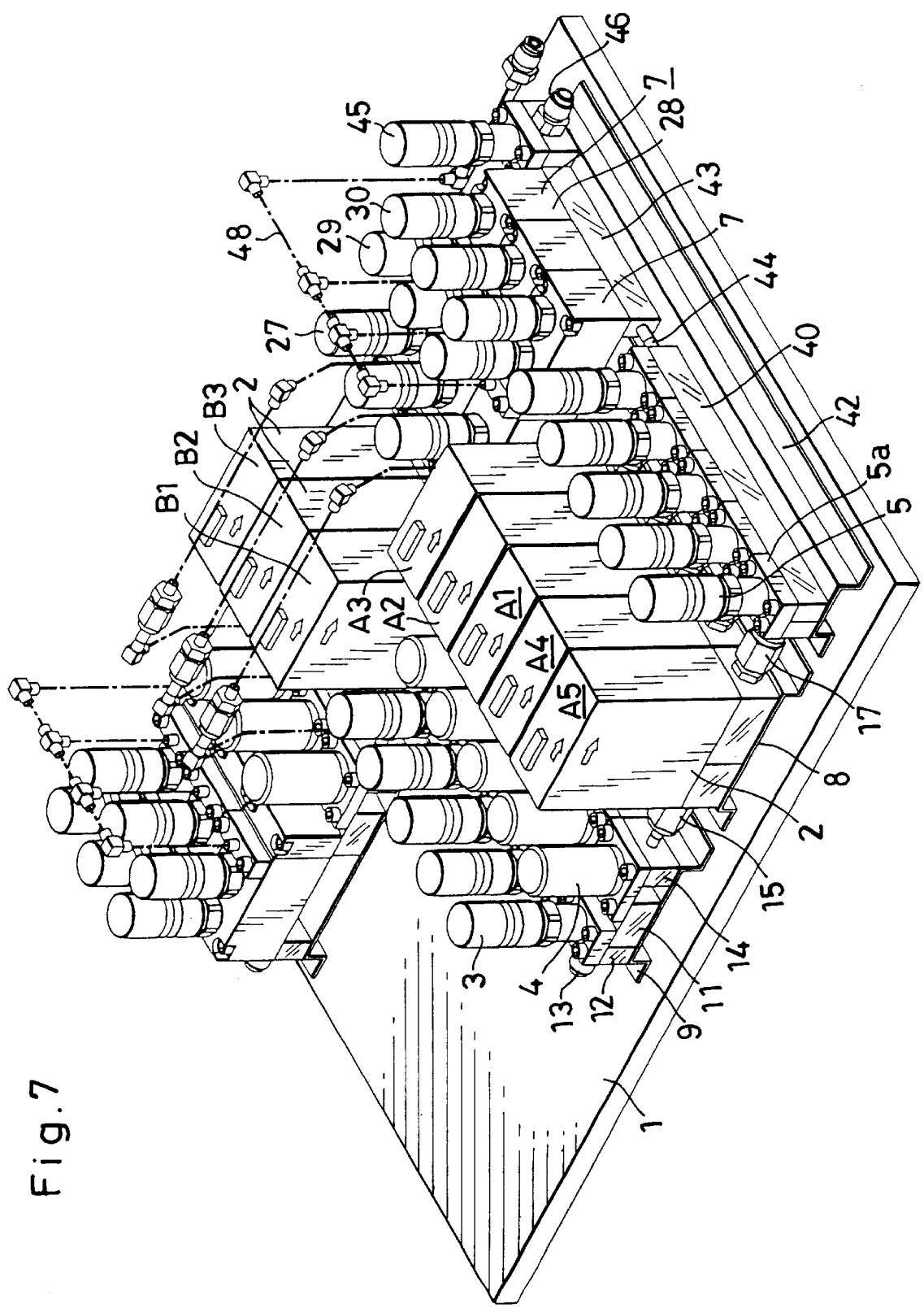
FIG. 7 is a perspective view showing a third embodiment of fluid control apparatus of the invention fabricated by adding the lines having no bypass channel to the fluid control apparatus of FIG. 5.

As shown in FIG. 5, the two channel closing blocks 41 are removed from the manifold block coupling 40 first, and a line A4 having no bypass channel assembled to the state shown in FIG. 2 is mounted as seen in FIG. 6. This procedure can be performed merely by fastening brackets 8, 9 to the substrate 1, with the body 5a of the outlet-side on-off valve 5 positioned in place in register with the corresponding branch channel 40c of the manifold block coupling 40. This procedure is repeated also for another line A5 having no bypass channel. Consequently obtained is a fluid control apparatus which comprises as arranged in parallel on the substrate 1 five lines A1, A2, A3, A4, A5 having no bypass channel and three bypass-equipped lines B1, B2, B3 as seen in FIG. 7.

Figure 8:
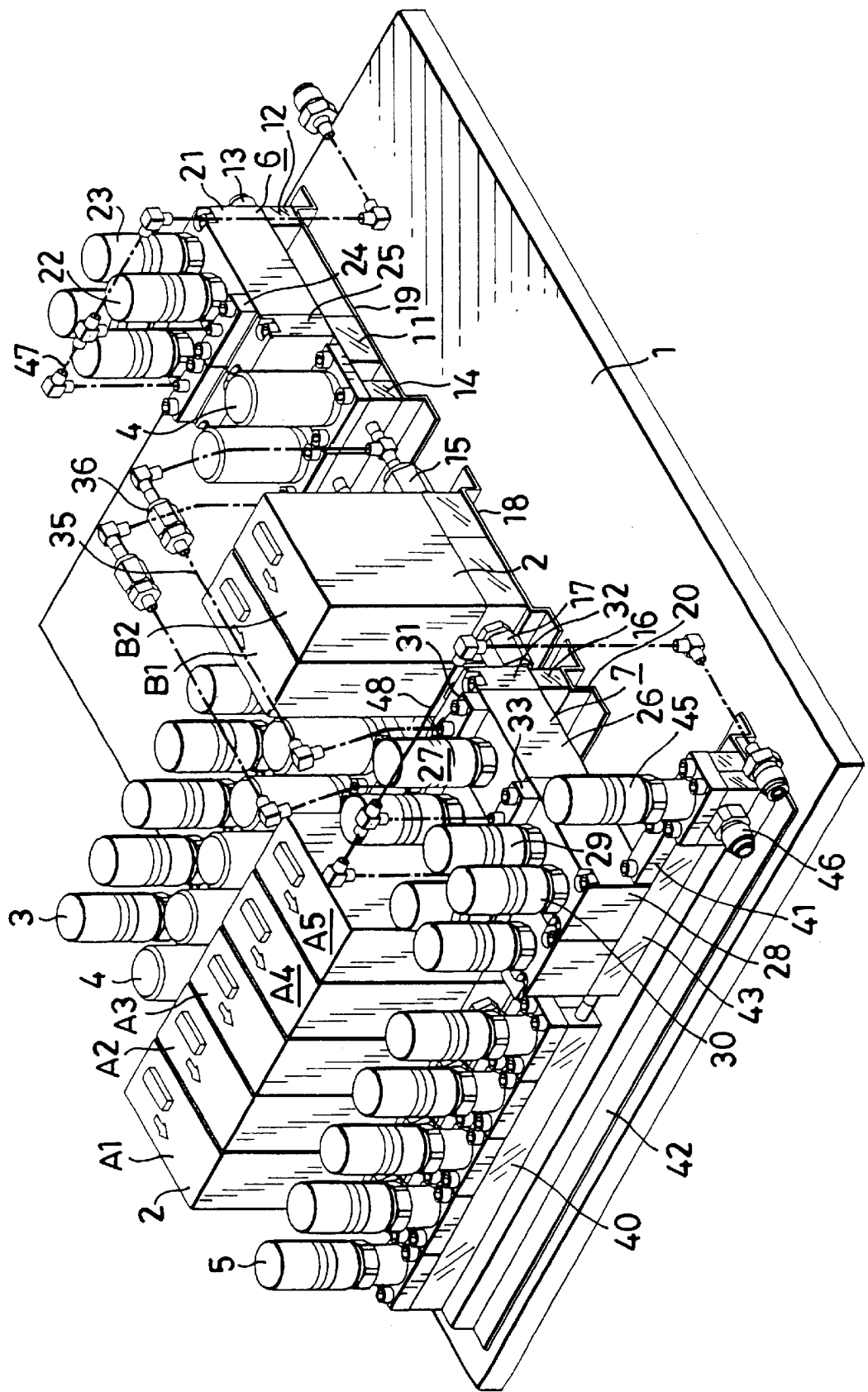
FIG. 8 is a perspective view showing a fourth embodiment of fluid control apparatus according to the invention.

A bypass-equipped line can be added in the following manner to a fluid control apparatus which comprises as arranged in parallel on a substrate 1 five lines A1, A2, A3, A4, A5 having no bypass channel and two bypass-equipped lines B1, B2 as shown in FIG. 8.

Figure 9:
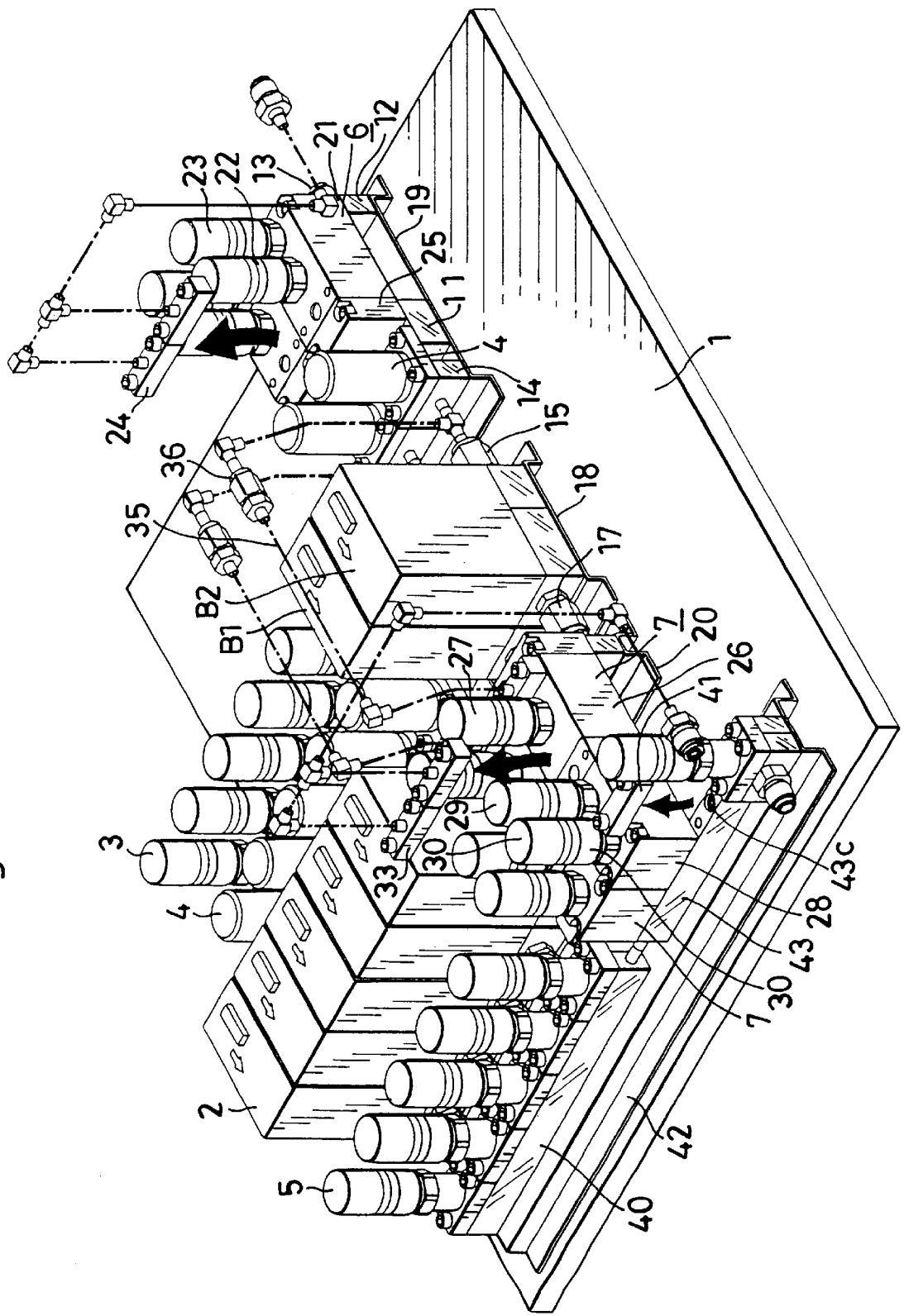
FIG. 9 is a perspective view for showing one step of a procedure for adding anew a line having a bypass channel to the fluid control apparatus of FIG. 8.
Figure 10:
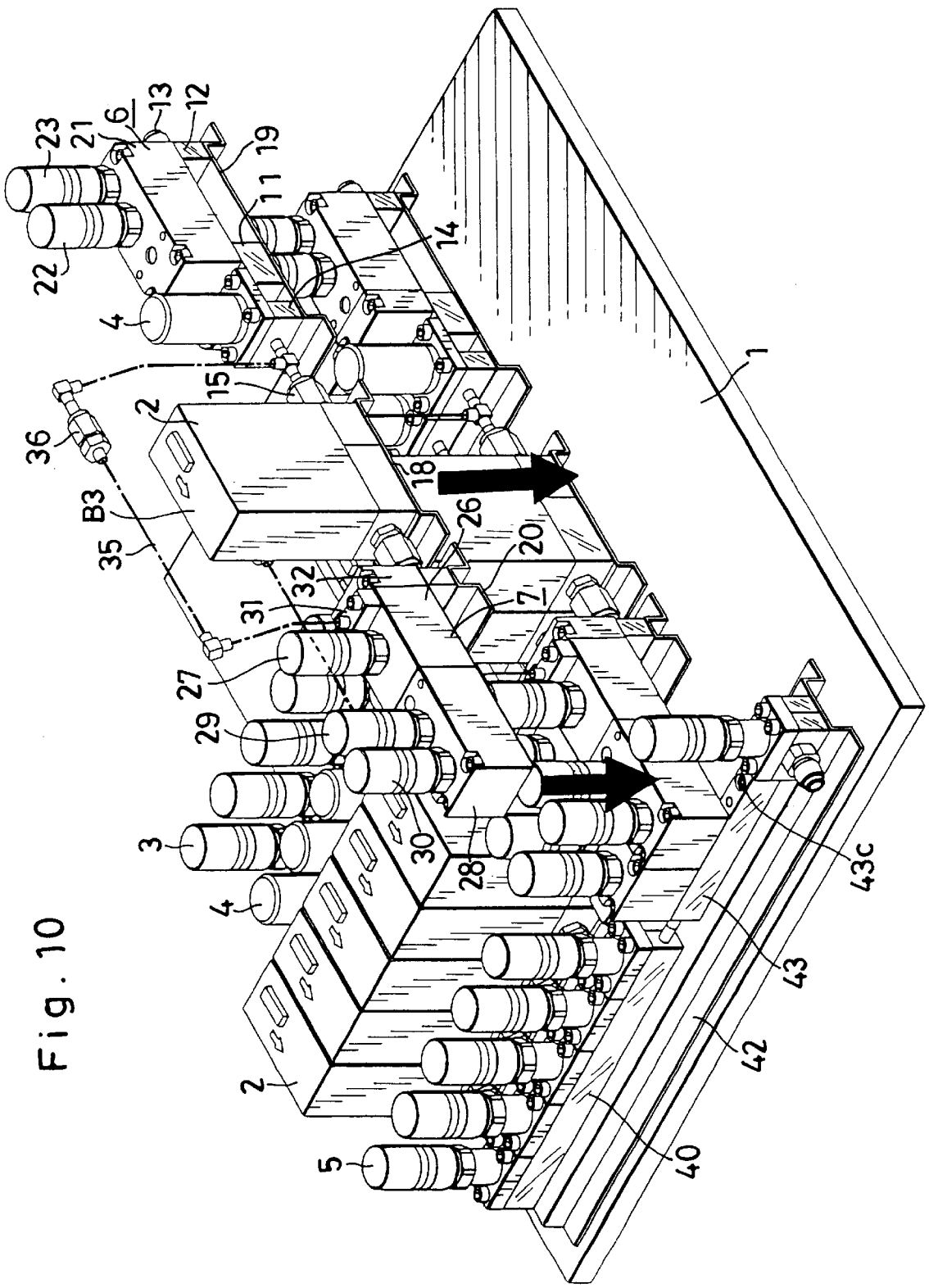
FIG. 10 is a perspective view for showing another step of the procedure for adding the bypass-equipped line anew to the fluid control apparatus of FIG. 8.
Figure 11:
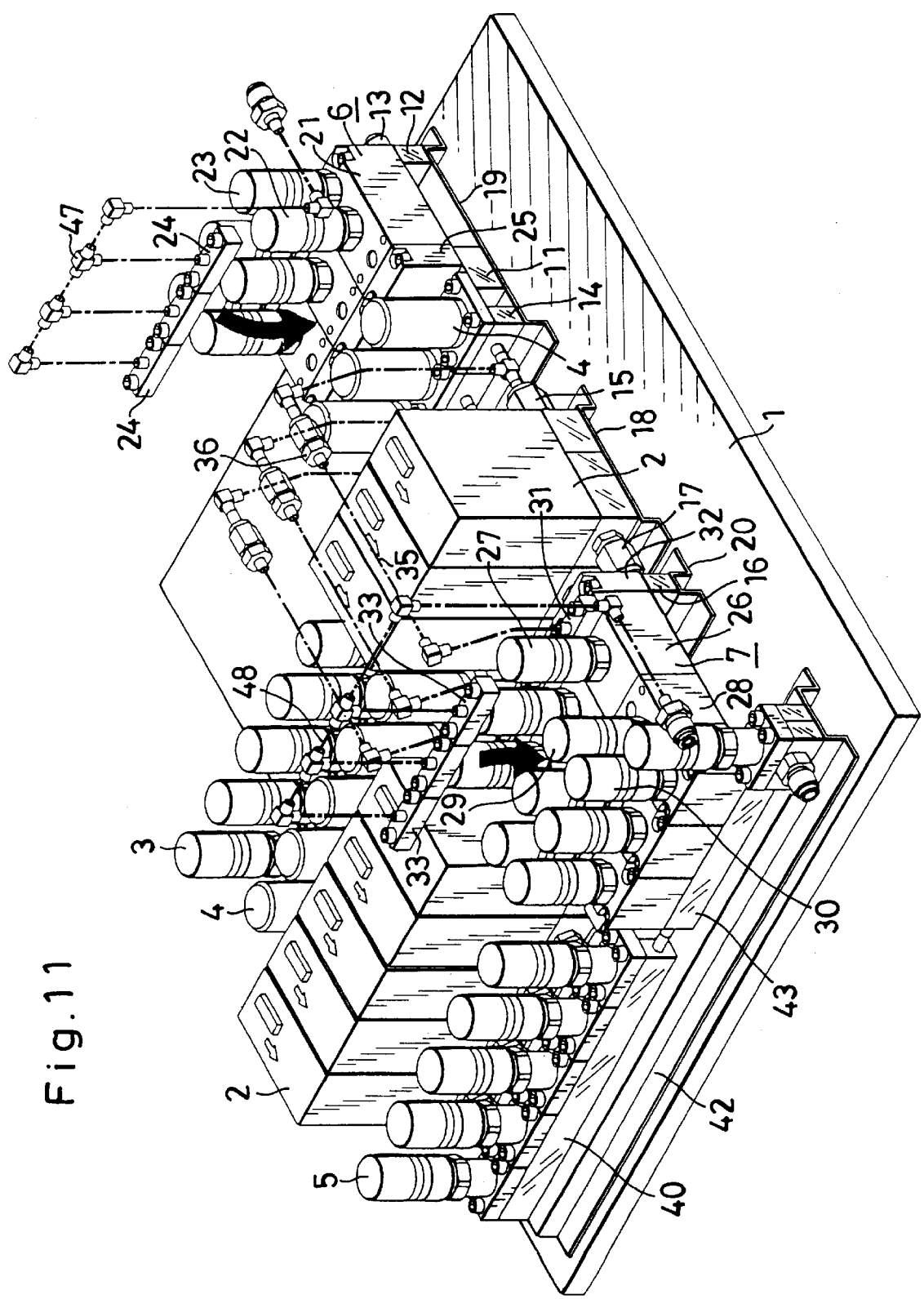
FIG. 11 is a perspective view for showing still another step of the procedure for adding the bypass-equipped line anew to the fluid control apparatus of FIG. 8.
Figure 12:
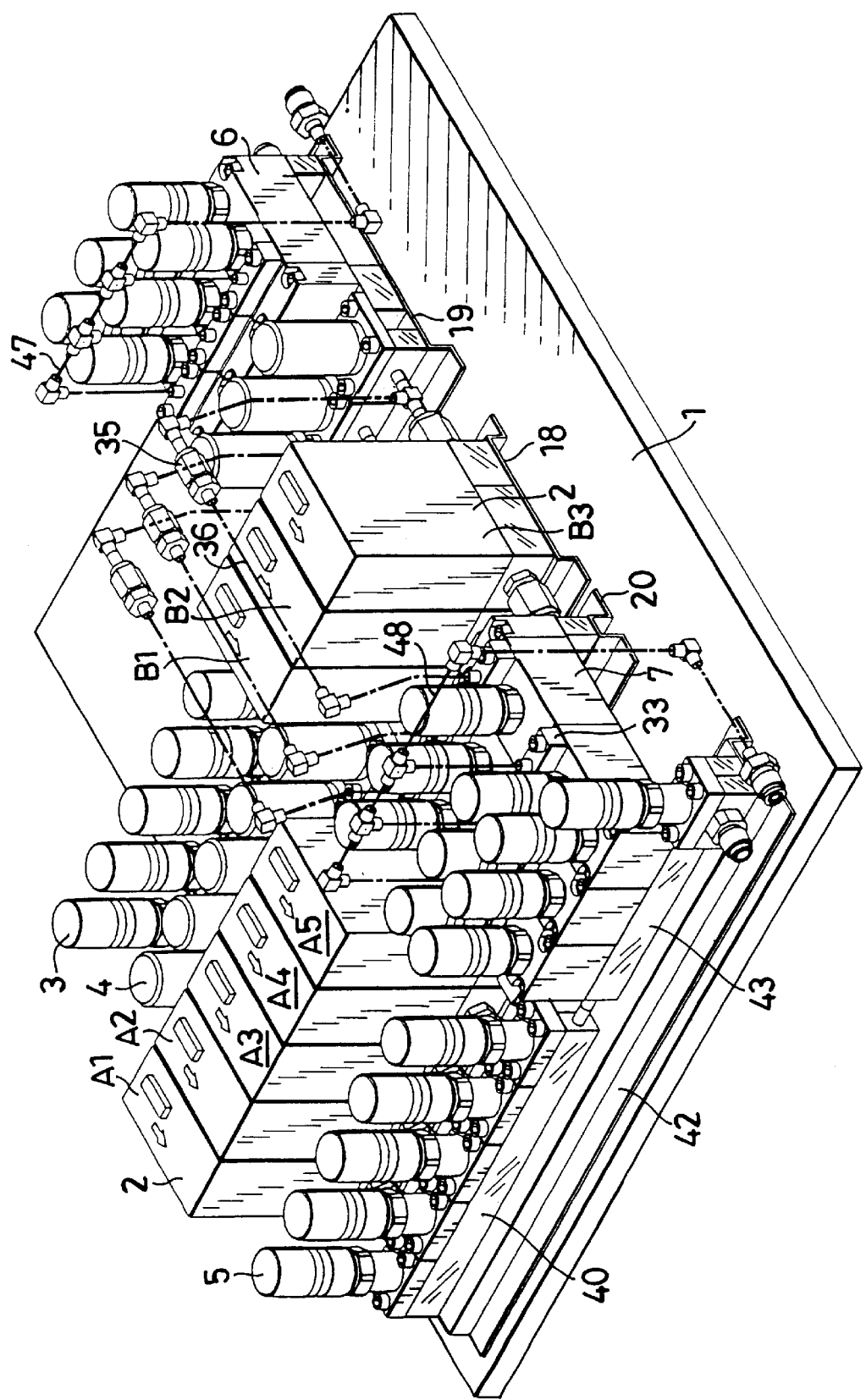
FIG. 12 is a perspective view showing a fluid control apparatus of the invention fabricated by adding the bypass-equipped line to the fluid control apparatus of FIG. 8, the view showing the third embodiment of FIG. 7 as it is seen from a different direction.

With reference to FIG. 9, the channel closing block 41 is first removed from the manifold block coupling 43 for the bypass-equipped lines, and at the same time, the tubular connector-equipped block couplings 24 of the inlet-side shutoff-opening devices 6 of two bypass-equipped lines B1, B2 and the tubular connector-equipped block couplings 33 on the second bodies of the outlet-side shutoff-opening devices 7 of the lines B1, B2 are removed along with the inverted U-shaped communication pipes 47, 48. A bypass-equipped line B3 assembled to the state shown in FIG. 3 is then mounted as shown in FIG. 10. This procedure can be performed merely by fastening brackets 18, 19, 20 to the substrate 1, with the second block body 28 of the outlet-side shutoff-opening device 7 positioned accurately for the corresponding branch channel 43c of the manifold block coupling 43. The tubular connector-equipped block couplings 24 of the inlet-side shutoff-opening devices 6 of the three lines B1, B2, B3 and the tubular connector-equipped block couplings 33 on the second bodies 28 of the outlet-side shutoff-opening devices 7 of the lines B1 to B3 are mounted in place along with the communication pipes 47, 48 as shown in FIG. 11. Consequently obtained is a fluid control apparatus which comprises as arranged in parallel on the substrate 1 five lines A1, A2, A3, A4, A5 having no bypass channel and three bypass-equipped lines B1, B2, B3 as seen in FIG. 12.

In the fluid control apparatus (shown in FIG. 12) comprising as arranged in parallel on the substrate 1 five lines A1, A2, A3, A4, A5 having no bypass channel and three bypass-equipped lines B1, B2, B3, the massflow controller 2 of the bypass-equipped line B3 is replaced by another one in the following manner.

Figure 13:
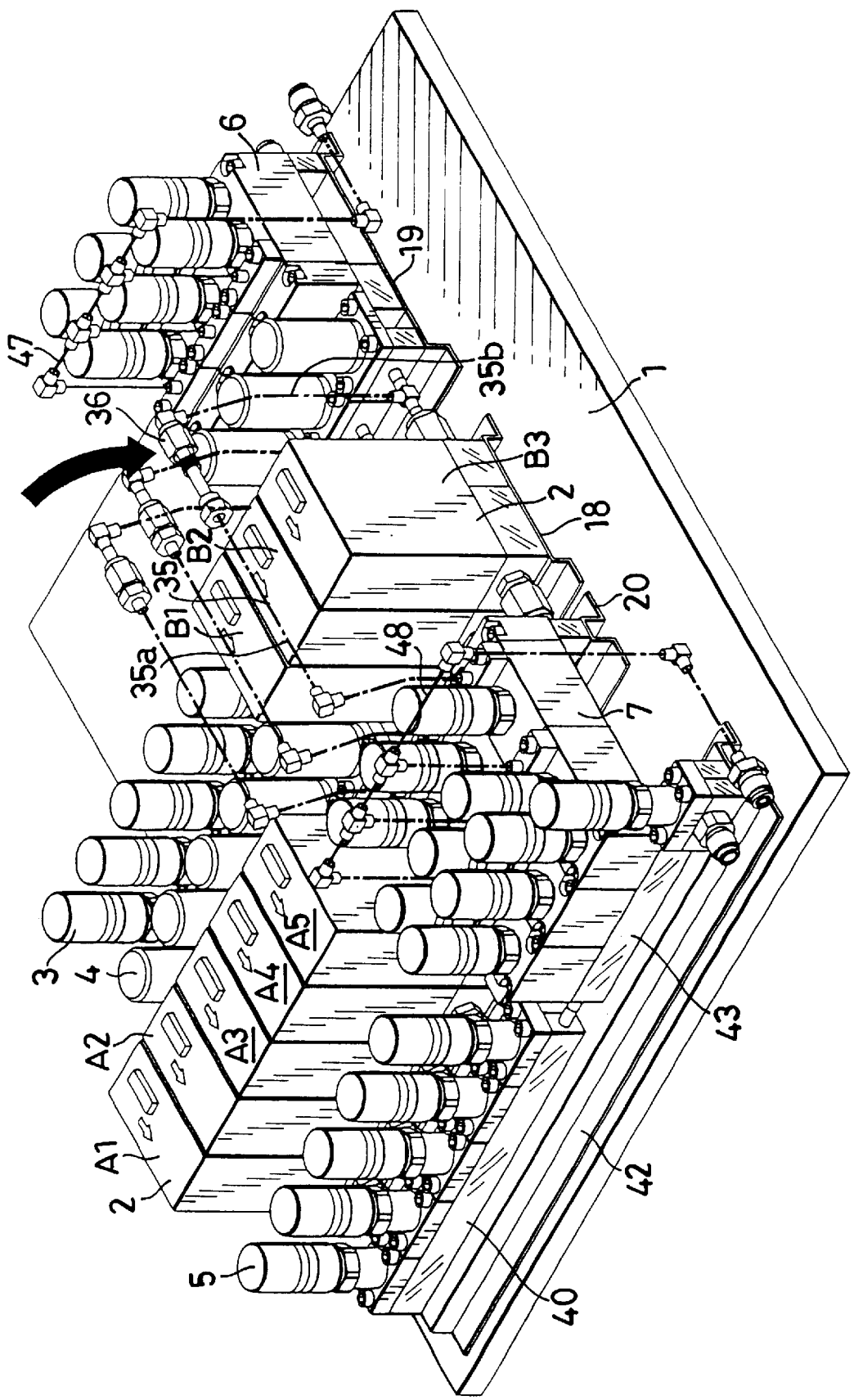
FIG. 13 is a perspective view showing one step of a procedure for removing a massflow controller from the fluid control apparatus shown in FIG. 12.
Figure 14:
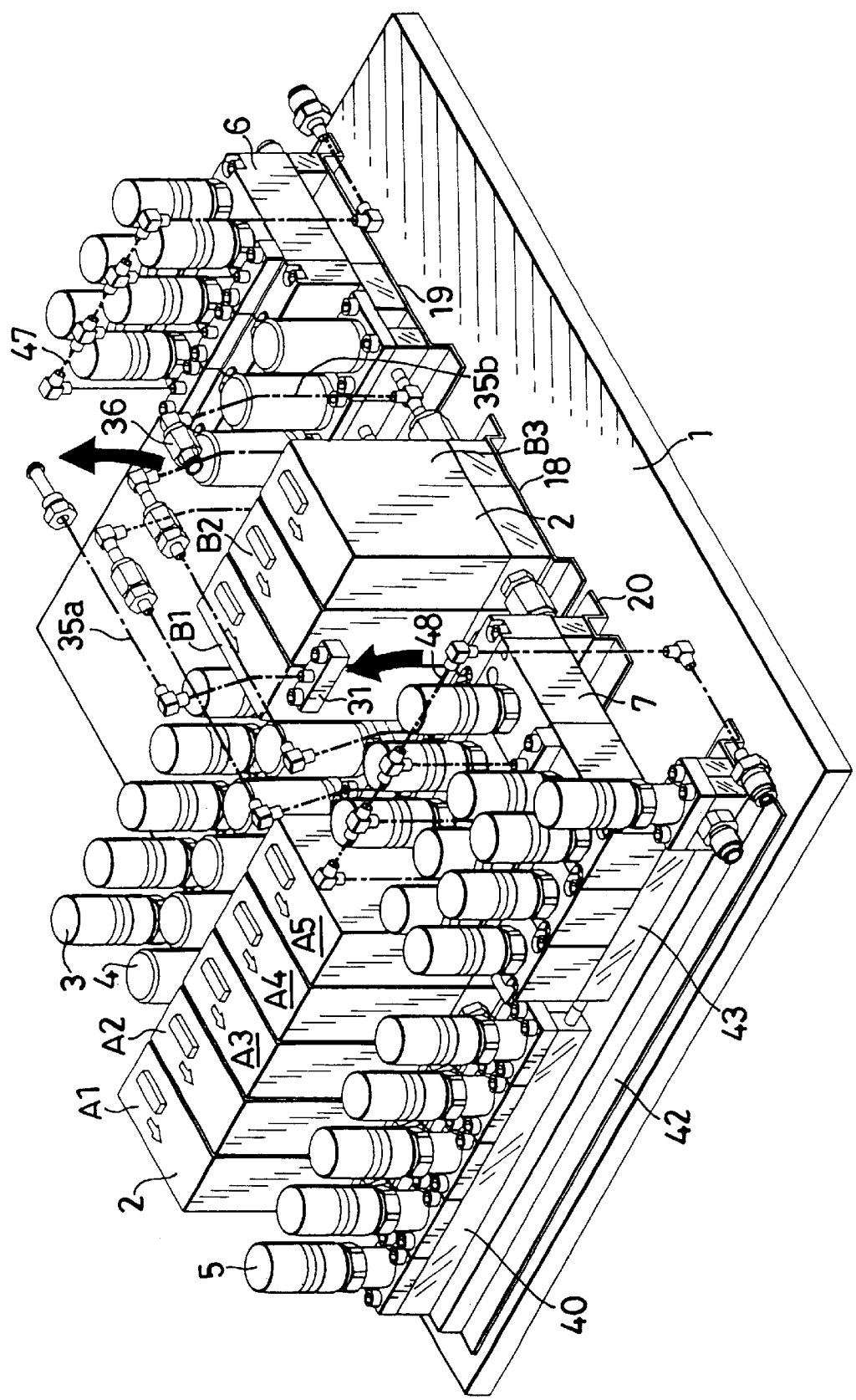
FIG. 14 is a perspective view showing another step of the procedure for removing the massflow controller from the fluid control apparatus shown in FIG. 12.
Figure 15:
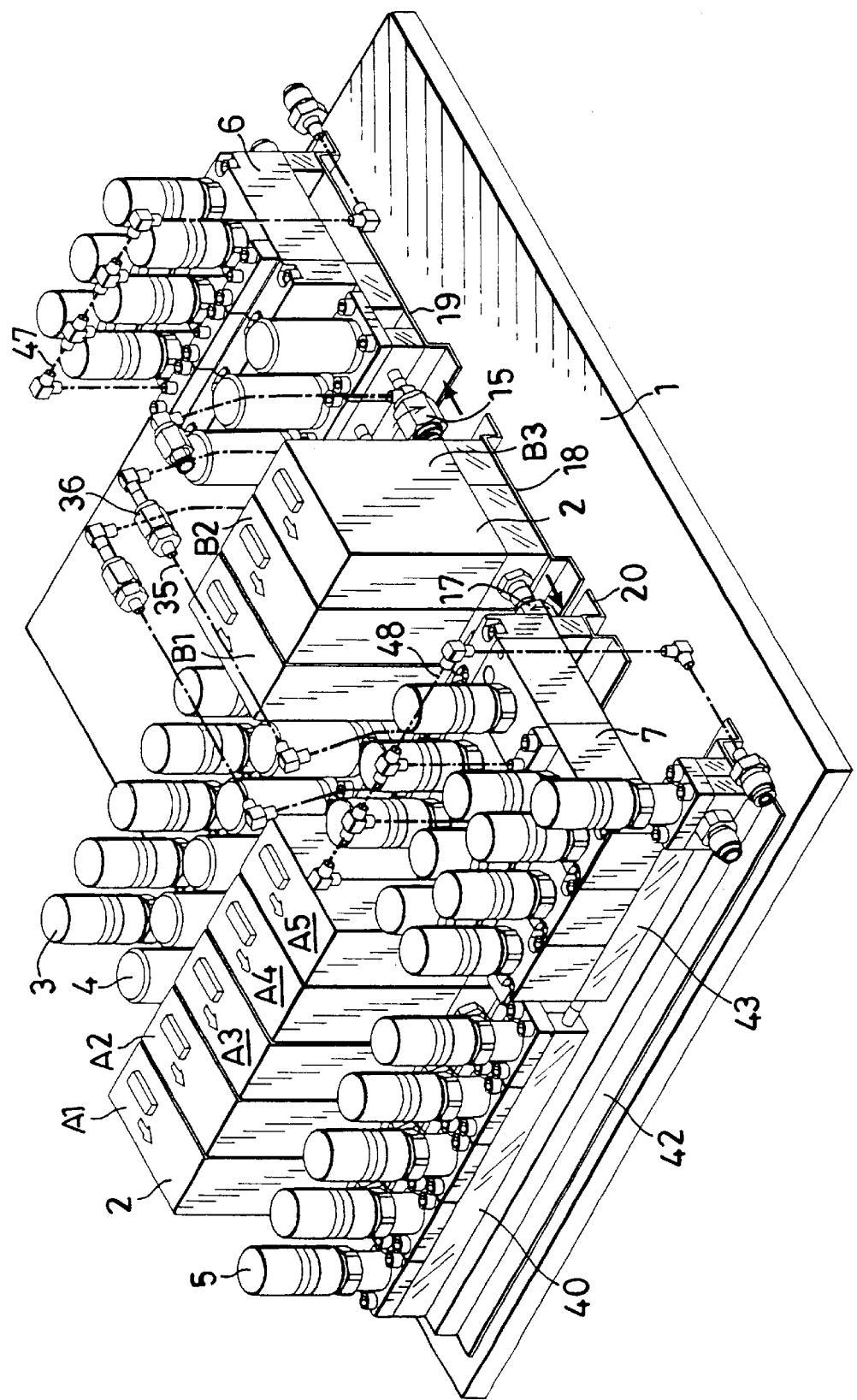
FIG. 15 is a perspective view showing another step of the procedure for removing the massflow controller from the fluid control apparatus shown in FIG. 12.
Figure 16:
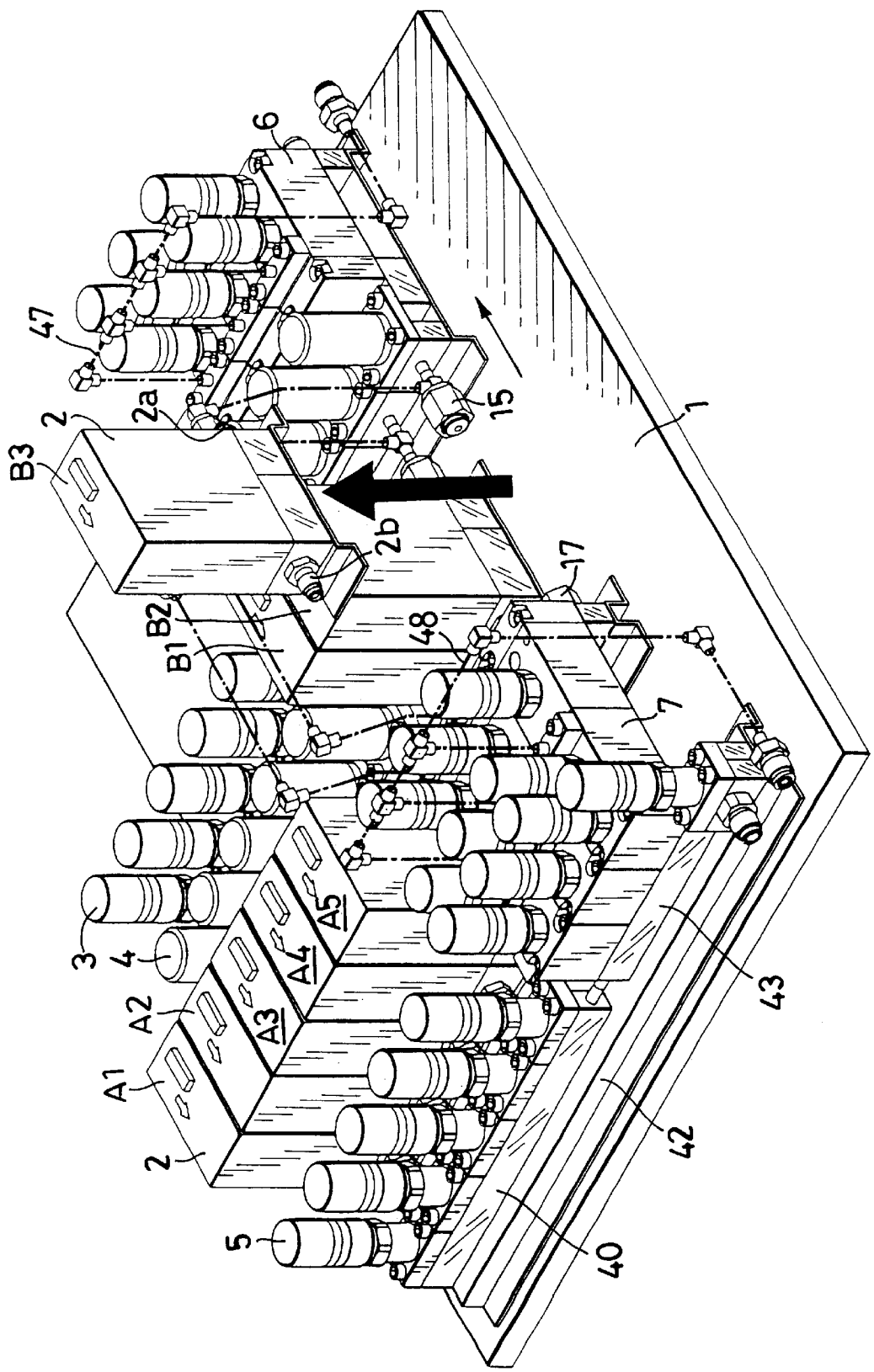
FIG. 16 is a perspective view showing still another step of the procedure for removing the massflow controller from the fluid control apparatus shown in FIG. 12.

As shown in FIG. 13, the tubular coupling 36 is first removed from the bypass pipe 35 of the bypass-equipped line B3. The tubular connector-equipped block coupling 31 of the outlet-side shutoff-opening device 7 is then removed with the inverted L-shaped portion 35a of the bypass pipe 35 attached to the coupling 31 as shown in FIG. 14. Next as seen in FIG. 15, the tubular couplings 15, 17 are removed from the inlet side and outlet side of the massflow controller 2, whereby the massflow controller 2 becomes removable upward as shown in FIG. 16. The massflow controller 2 can be installed in place by performing this sequence of steps in reverse order.

Figure 17:
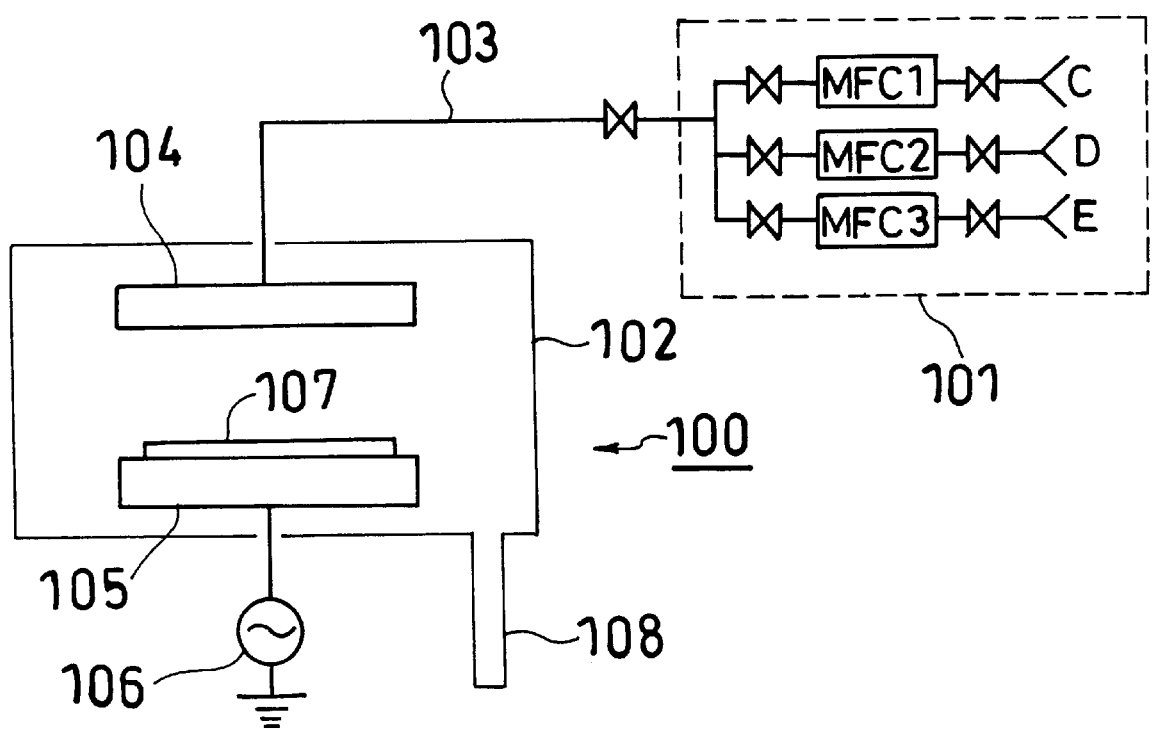
FIG. 17 is a system diagram showing an example of gas treatment system comprising the fluid control apparatus of the invention.
Figure 18:
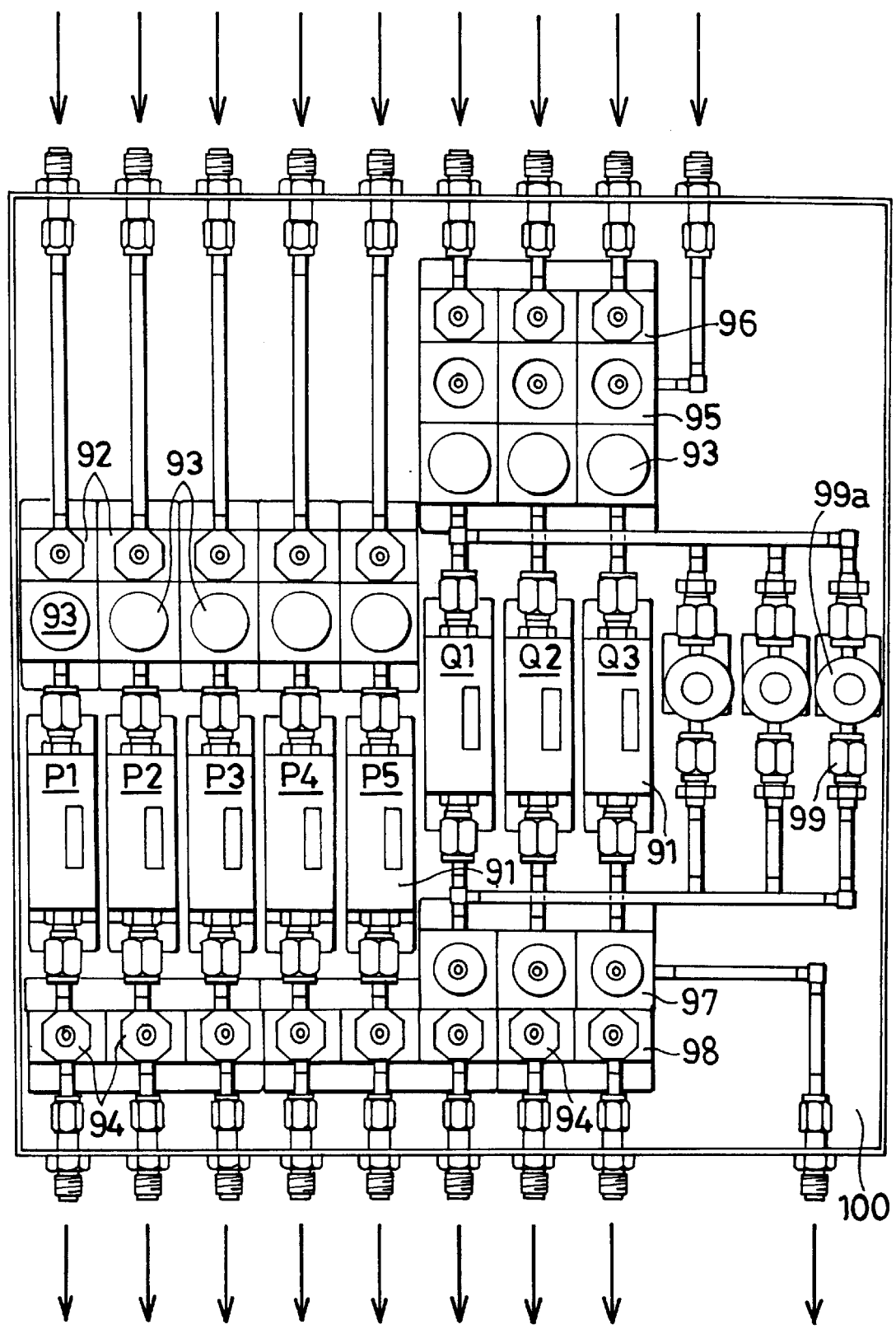
FIG. 18 is a plan view showing a conventional fluid control apparatus.

The fluid control apparatus described are used preferably in gas treatment systems, for example, for conducting treatment with plasma, etching or forming films by CVD. FIG. 17 shows an example of gas treatment system.

This system is a plasma etching system 100 having incorporated therein a fluid control apparatus 101 usually having three lines C, D, E. The apparatus 101 is accommodated in a box having a closed structure for preventing the accident of gas leaks and adapted to discharge gases. The etching gas supplied from the apparatus 101 is introduced into a reaction chamber 102 by way of a gas supply pipe 103 and a gas shower head 104 disposed within the chamber 102. The etching gas admitted is discharged from the chamber 102 via an exhaust pipe 108 and through an unillustrated exhaust line. At this time, high-frequency waves are applied to a substrate holder 105 by a high-frequency power source 106 for generating plasma, whereby a plasma discharge is effected in the vicinity of a substrate 107 to etch the substrate 107.

Silicon dioxide films can be etched by this plasma etching system 100 using, for example, $CHF_3$, $O_2$ and $C_2F_6$ as gases. To render this system usable for etching polysilicon, it is necessary to provide additional lines for $Cl_2$ and $SF_6$ gases. When a conventional fluid control apparatus is used in this case, there is a need to remove all the fluid control devices such as massflow controllers, prepare welded piping anew and assemble the fluid control devices again. In such a case, the gas piping is exposed to the atmosphere for a prolonged period of time, permitting the water in the atmosphere to react with the gas components adsorbed by the piping and giving rise to the problem that the piping will develop corrosion. For this reason, the gas-exposed portions of the components other than those additionally used or replaced must all be separated off and washed. With the plasma etching system comprising the fluid control apparatus of the invention, only the components required for the additional gases can be added to the fluid control apparatus, hence a greatly facilitated modification.

The gas treatment systems comprising the present fluid control apparatus include, in addition to the plasma etching system, CVD systems, plasma CVD systems and sputtering systems wherein gases are used as mixed together or into which gases are introduced. Any of such systems can be modified easily for the use of different gases or additional gases.

What is claimed is:

1. A fluid control apparatus comprising a plurality of lines (A1), (A2), (A3), (A4), (A5), (B1), (B2, (B3), arranged in parallel on a substrate (1) and having outlets oriented in the same direction, each of the lines (A1), (A2), (A3, (A4), (A5), (B1), (B2), (B3) comprising a plurality of fluid control devices (2), (3), (4), (5), (6) arranged at an upper level and a plurality of coupling members (11), (12), (13), (14), (15), (16), (17) arranged at a lower level, said lines including specified lines (B1), (B2), (B3) connected to one another by channel communication means (47), (48), the fluid control apparatus being characterized in that:

each of the lines (A1), (A2), (A3), (A4), (A5), (B1), (B2), (B3) is removably attached to the substrate (1) by a plurality of brackets (8), (9), (18), (19), (20), the channel communication means (47), (48) being removable upward, wherein a manifold block coupling (40), (43) disposed at the lower level for connecting at least three of the lines (A1), (A2), (A3), (A4), (A5), (B1), (B2), (B3) is provided by on at least one of inlet side and outlet side and attached to the substrate (1) by a bracket (42).

2. A fluid control apparatus according to claim 1 wherein the manifold block coupling (40), (43) is provided with at least one line adding branch channel (40c) having an opening closed with a closing member (41).

3. A fluid control apparatus comprising a plurality of lines (A1), (A2), (A3), (A4), (A5), (B1), (B2), (B3) arranged in parallel on a substrate (1) and having outlets oriented in the same direction, each of the lines (A1), (2), (A3), (A4), (A5), (B1), (B2), (B3) comprising a plurality of fluid control devices (2), (3), (4), (5), (6), (7) arranged at an upper level and a plurality of coupling members (11), (12), (13), (14), (15), (16), (17) arranged at a lower level, said lines including specified lines (B1), (B2), (B3) connected to one another by channel communication means (47), (48), the fluid control apparatus being characterized in that:

each of the lines (Al), (A2), (A3), (A4), (A5), (B1), (B2), (B3) is removably attached to the substrate (1) by a plurality of brackets (8), (9), (18), (19), (20), the channel communication means (47), (48) being removable upward, wherein the lines (A1), (A2), (A3), (A4), (A5), (B1), (B2), (B3) are lines (A1), (A2), (A3), (A4), (A5) having no bypass channel and lines (B1), (B2), (B3) each having a bypass channel, and the bypass-equipped lines (B1), (B2), (B3) each have a bypass pipe (35) for connecting an inlet side of a specified fluid control device (2) to an outlet side thereof above the fluid control device (2).

4. A gas treatment system comprising a fluid control apparatus according to any one of claims 1 or 3.

5. A plasma treatment system comprising a fluid control apparatus according to any one of claims 1 or 3.

* * * * *